United States Patent
Furudate

(10) Patent No.: US 9,130,690 B1
(45) Date of Patent: Sep. 8, 2015

(54) RECEIVING DEVICE

(71) Applicant: FUJITSU LIMITED, Kawasaki-shi, Kanagawa (JP)

(72) Inventor: Hideki Furudate, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/583,179

(22) Filed: Dec. 25, 2014

(30) Foreign Application Priority Data

Feb. 27, 2014 (JP) .................................. 2014-037072

(51) Int. Cl.
| H04B 1/10 | (2006.01) |
| H04J 11/00 | (2006.01) |
| H04B 7/08 | (2006.01) |
| H04L 27/26 | (2006.01) |

(52) U.S. Cl.
CPC .......... *H04J 11/0063* (2013.01); *H04B 7/0845* (2013.01); *H04L 27/2647* (2013.01)

(58) Field of Classification Search
CPC .... H04B 1/123; H04B 7/002; H04L 25/0204; H04L 25/0232; H04L 27/2601; H04L 27/2602
USPC .......... 375/349, 316, 347; 370/252, 329, 330, 370/345
See application file for complete search history.

(56) References Cited

U.S. PATENT DOCUMENTS

| 2011/0286501 A1* | 11/2011 | Hamaguchi et al. .......... 375/219 |
| 2013/0223269 A1* | 8/2013 | To et al. .......................... 370/252 |
| 2013/0259011 A1* | 10/2013 | Nakashima et al. .......... 370/336 |
| 2014/0192854 A1* | 7/2014 | Umeda .......................... 375/232 |

FOREIGN PATENT DOCUMENTS

| JP | 2006-186421 | 7/2006 |
| JP | 2006-217399 | 8/2006 |
| JP | 2009-141740 | 6/2009 |
| JP | 2010-226233 | 10/2010 |
| JP | 2011-188221 | 9/2011 |

* cited by examiner

*Primary Examiner* — Khai Tran
(74) *Attorney, Agent, or Firm* — Fujitsu Patent Center

(57) ABSTRACT

A receiving device includes: a propagation path compensation unit that compensates a signal by using a propagation path characteristic; a power arithmetic section that arithmetically operates power of a signal; a first reciprocal processing section that performs reciprocal processing on power to output a signal; an error arithmetic section that arithmetically operates an error of the compensated signal; a subtractor that subtracts the signal output from the first reciprocal processing section from the error; a second reciprocal processing unit that performs reciprocal processing on the signal output from the subtractor to output a signal; a first multiplier that multiplies the power and the signal output from the second reciprocal processing unit together to output a signal; and a second multiplier that multiplies the signal compensated by the propagation path compensation unit and the signal output from the first multiplier together to output a signal to an adder.

6 Claims, 8 Drawing Sheets

F I G. 5A
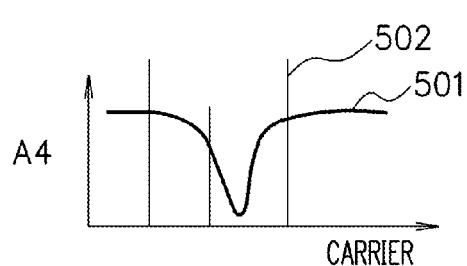
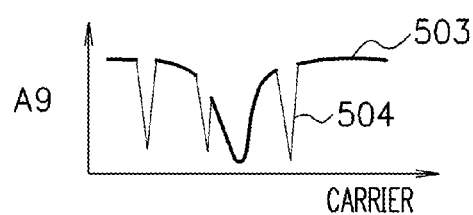
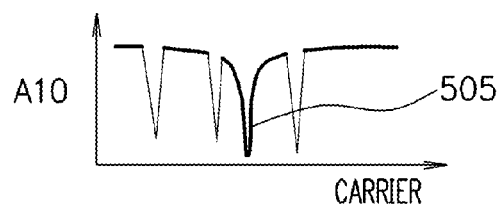
F I G. 5B
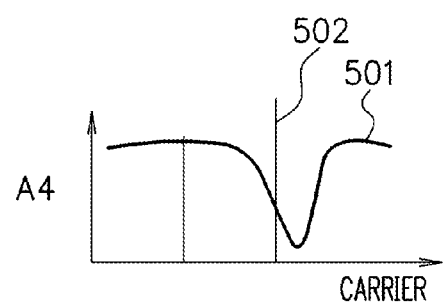
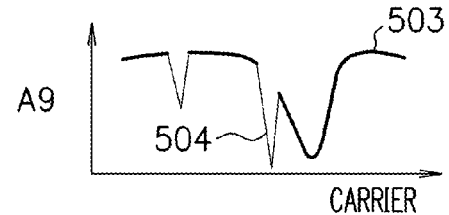
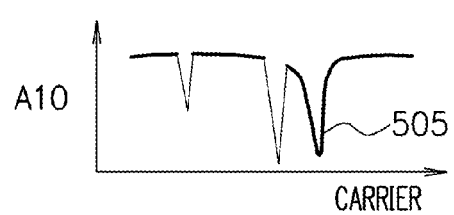

FIG. 7A
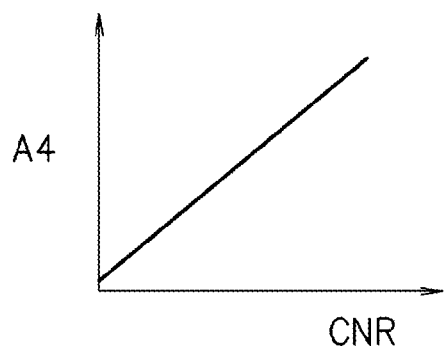
FIG. 7B
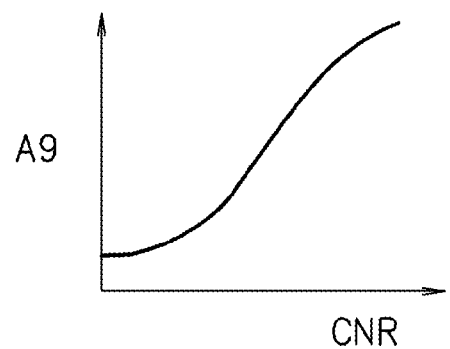
FIG. 8
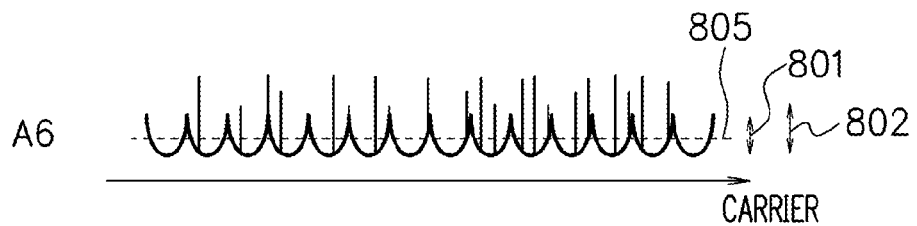
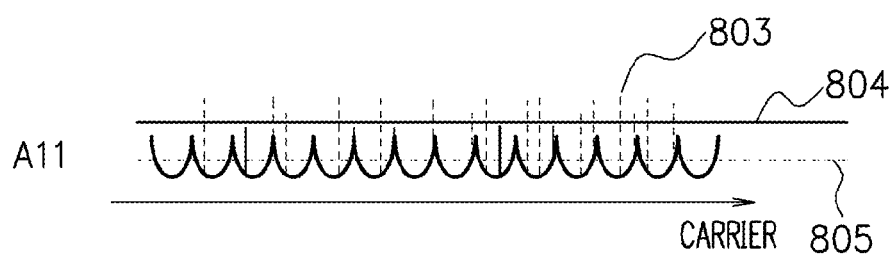

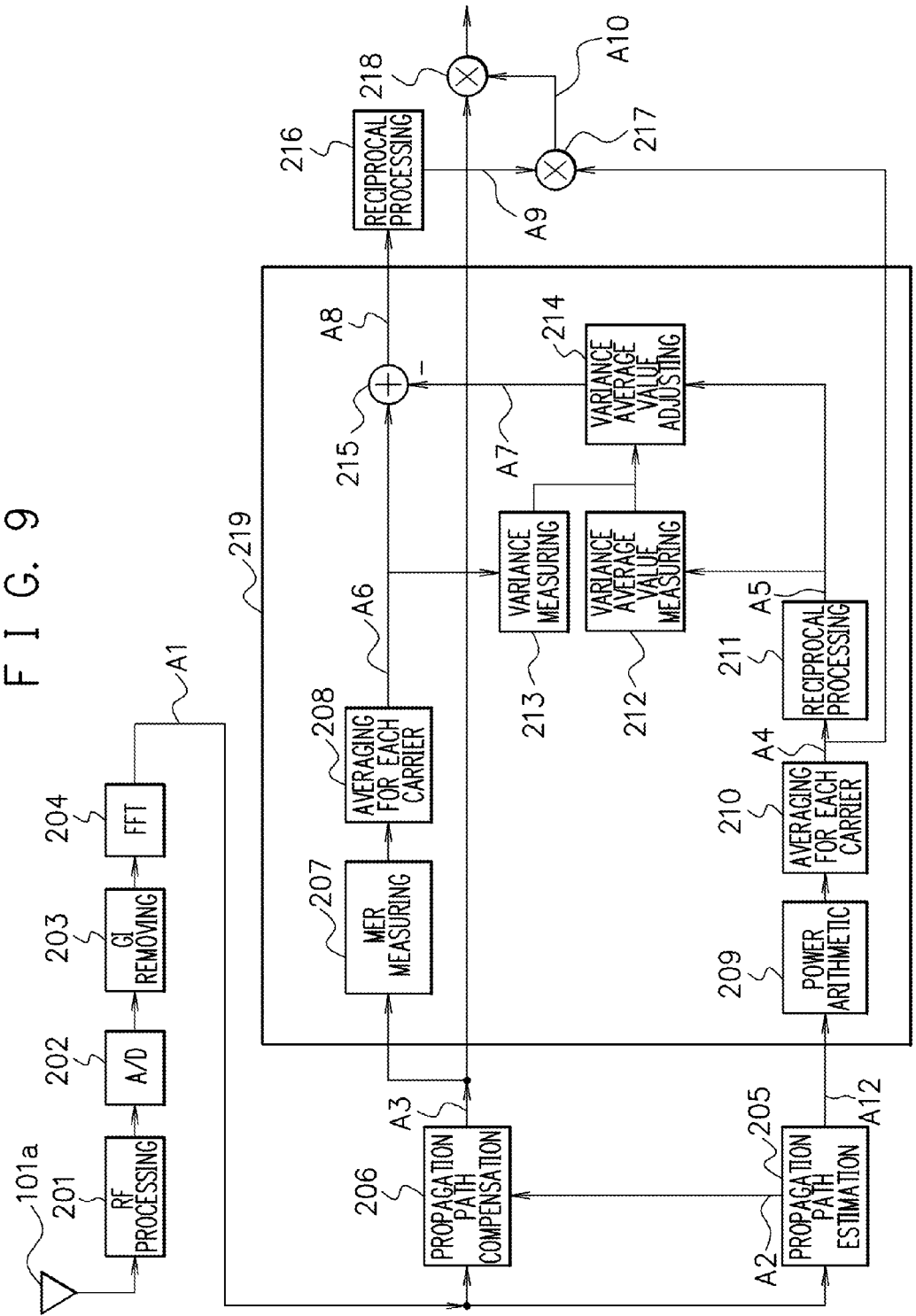

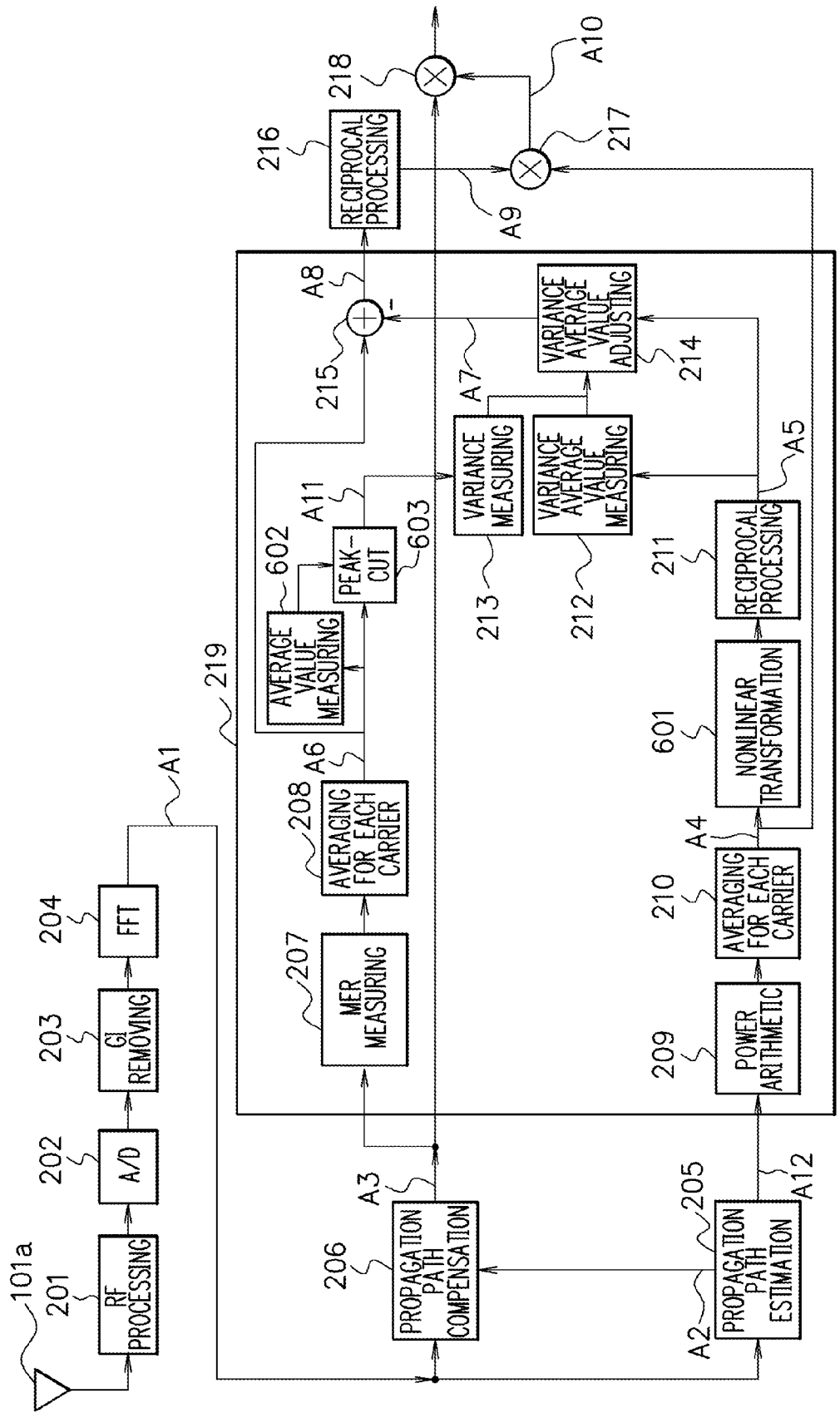

RECEIVING DEVICE

CROSS-REFERENCE TO RELATED APPLICATION

This application is based upon and claims the benefit of priority of the prior Japanese Patent Application No. 2014-037072, filed on Feb. 27, 2014, the entire contents of which are incorporated herein by reference.

FIELD

The embodiments discussed herein are directed to a receiving device.

BACKGROUND

There has been known an on-vehicle apparatus that receives in a diversity reception system a broadcasting signal modulated in an orthogonal frequency division multiplexing system (see Patent Document 1, for example). A plurality of receiving parts receive a broadcasting signal. A weighting value setting part sets a weighting value according to a signal level of each of the broadcasting signals received by the receiving parts. A signal combination part performs weighting processing by a weighting value set by the weighting value setting part on the respective broadcasting signals corresponding to respective carrier frequencies received by the receiving parts, and maximum-ratio-combines broadcasting signals obtained after the weighting processing. The weighting value setting part includes: an interference detection part; and a weighting value adjustment part. The interference detection part detects a carrier frequency containing noise from the received broadcasting signal. The weighting value setting part sets, as a weighting value to be applied to the carrier frequency detected by the interference detection part, a weighting value lower than the weighting value set according to the signal level.

There has been known an ICI amount estimation device that is included in a receiving device of a multicarrier signal and estimates an ICI amount in a carrier signal (see Patent Document 2, for example). A propagation path variation estimation unit calculates a variation amount of a propagation path frequency characteristic to output a propagation path variation characteristic. A fixity coefficient multiplying unit multiplies the propagation path variation characteristic by a fixity coefficient determined according to the predetermined number of carriers. The ICI amount estimation device estimates an ICI amount in each carrier based on the propagation path variation characteristic.

There has been known a receiving device including a plurality of antennas (see patent Document 3, for example). A plurality of synthesizing units generate weighting coefficients used for controlling amplitudes and phases of baseband signals only by the number of baseband signals by using band components different from one another out of individual baseband signals obtained by the plurality of antennas and multiply the individual baseband signals and the individual weighting coefficients together respectively, and then add these. A plurality of demodulation circuits, on synthesized signals output from the individual synthesizing units, perform fast Fourier transformation and perform demodulation processing based on an orthogonal frequency division multiplexing system for each subcarrier, and thereby generate amplitude and phase data. A carrier synthesizing unit synthesizes data output from the individual demodulation circuits for each subcarrier.

There has been known an OFDM diversity receiver having a plurality of reception branches that receive orthogonal frequency division multiplexing (OFDM) signals containing a plurality of subcarriers orthogonal to each other and output the received signals individually (see Patent Document 4, for example). An interference wave detection unit determines the presence and absence of an interference wave in each subcarrier of the received signals and estimates a first subcarrier group where interference waves exist and a second subcarrier group where no interference waves exist. A multiplying unit multiplies the first subcarrier group by a first weight used for eliminating the interference waves and multiplies the second subcarrier group by a second weight used for maximizing a signal-to-noise ratio. A combining unit combines output signals from the multiplying unit.

There has been known a receiving device for combining OFDM signals that receives an OFDM signal by a reception antenna composed of a plurality of array elements (see Patent Document 5, for example). A FFT unit transforms an OFDM signal received by the reception antenna into a reception carrier symbol in a frequency domain. An array combining unit weights and combines the reception carrier symbol by a first weighting coefficient for each subcarrier composing the OFDM signal to generate an array combined signal. A weighting coefficient optimizing unit generates a reference signal in which a transmission symbol has been estimated and generates a second weighting coefficient so that an error between the reference signal and the array combined signal may become minimum. A filter processing unit filters the reciprocal of the second weighting coefficient and then generates the re-reciprocal of the filtered reciprocal of the second weighting coefficient as a first weighting coefficient.

[Patent Document 1] Japanese Laid-open Patent Publication No. 2010-226233

[Patent Document 2] Japanese Laid-open Patent Publication No. 2009-141740

[Patent Document 3] Japanese Laid-open Patent Publication No. 2006-217399

[Patent Document 4] Japanese Laid-open Patent Publication No. 2006-186421

[Patent Document 5] Japanese Laid-open Patent Publication No. 2011-188221

In radio communication, frequency selective fading caused by multipath occurs and reception quality deteriorates. Further, a spurious wave in a narrow-band is sometimes mixed in a frequency band of a reception signal. When power of a spurious wave becomes large to some extent with respect to a desired wave in a carrier unit, reception quality in a carrier with spurious waves deteriorates.

SUMMARY

A receiving device includes: a plurality of antennas; each of a plurality of receiving circuits that receive signal via one of the plurality of antennas, respectively; and an adder that adds signals output from the plurality of receiving circuits, in which each of the plurality of receiving circuits includes: a Fourier transformation unit that transforms a signal into a frequency domain from a time domain; a propagation path estimation unit that estimates a propagation path characteristic based on a known signal in the signal in the frequency domain transformed by the Fourier transformation unit; a propagation path compensation unit that compensates the signal in the frequency domain transformed by the Fourier transformation unit by using the propagation path characteristic estimated by the propagation path estimation unit; a power arithmetic section that arithmetically operates power of the signal in the frequency domain transformed by the Fourier transformation unit; a first reciprocal processing section that performs reciprocal processing on the power arithmetically operated by the power arithmetic section to output a signal; an error arithmetic section that arithmetically operates an error of the signal compensated by the propagation path compensation unit; a subtractor that subtracts the signal output from the first reciprocal processing section from the error arithmetically operated by the error arithmetic section to output a signal; a second reciprocal processing unit that performs reciprocal processing on the signal output from the subtractor to output a signal; a first multiplier that multiplies the power arithmetically operated by the power arithmetic section and the signal output from the second reciprocal processing unit together to output a signal; and a second multiplier that multiplies the signal compensated by the propagation path compensation unit and the signal output from the first multiplier together to output a signal to the adder.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A and FIG. 5B are views illustrating examples of signals when a subtractor is removed from FIG. 2;

FIG. 7A and FIG. 7B are views for explaining a transformation method of a nonlinear transformation section in FIG. 6;

FIG. 8 is a view for explaining processing methods of an average value measuring section and a peak-cut section in FIG. 6;

FIG. 9 is a diagram illustrating a configuration example of a first receiving circuit according to a third embodiment; and FIG. 10 is a diagram illustrating a configuration example of a first receiving circuit according to a fourth embodiment.

DESCRIPTION OF EMBODIMENTS

First Embodiment

Figure 1:
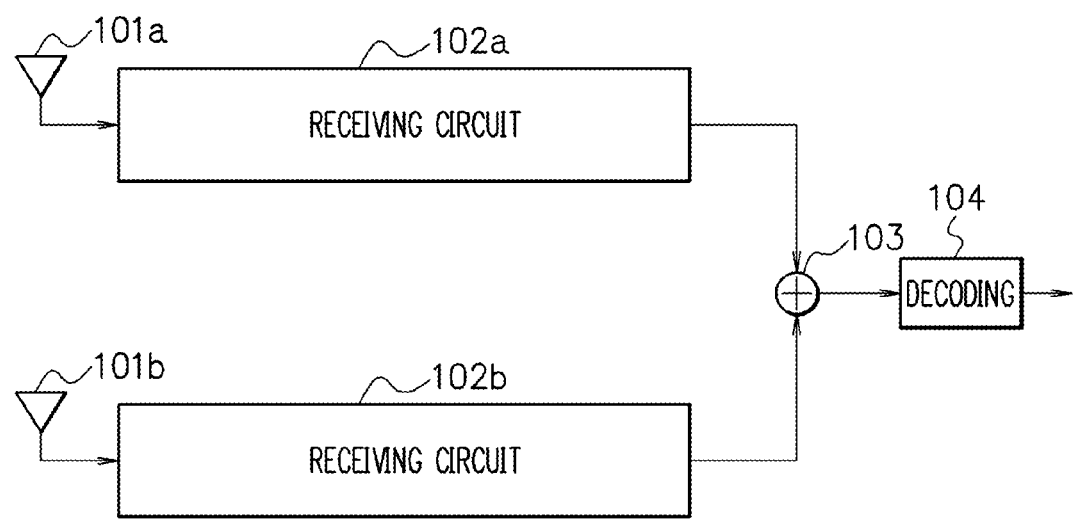
FIG. 1 is a view illustrating a structure example of a receiving device according to a first embodiment.

FIG. 1 is a view illustrating a structure example of a receiving device according to a first embodiment. The receiving device includes: a first antenna 101a; a first receiving circuit 102a; a second antenna 101b; a second receiving circuit 102b; an adder 103; and a decoding unit 104. A radio signal that a transmitting device transmits propagates to a radio apparatus via a plurality of paths having different propagation times due to reflection from a building and the like (multipath). Thereby, fading caused by interference, phase shift, or the like of the radio signal occurs. The antennas 101a and 101b are disposed mutually at an interval corresponding to wavelengths of radio reception signals to receive radio signals. The first receiving circuit 102a receives the signal received via the first antenna 101a and compensates the received signal according to a propagation path characteristic to restore a transmitted signal. The second receiving circuit 102b receives the signal received via the second antenna 101b and compensates the received signal according to a propagation path characteristic to restore a transmitted signal. Further, the first receiving circuit 102a weights the received signal of the first antenna 101a by a first weighting coefficient according to a carrier-to-noise ratio (CNR) of the received signal of the first antenna 101a to output a signal. The second receiving circuit 102b weights the received signal of the second antenna 101b by a second weighting coefficient according to a carrier-to-noise ratio (CNR) of the received signal of the second antenna 101b to output a signal. When the CNR is large, the weighting coefficient is increased, and when the CNR is small, the weighting coefficient is decreased. The adder 103 adds the received signal weighted by the first receiving circuit 102a and the received signal weighted by the second receiving circuit 102b to output a signal. Thereby, it is possible to decrease an effect of fading caused by multipath to improve reception quality. The decoding unit 104 decodes the signal output from the adder 103.

Incidentally, the example where two pairs of a pair of the first antenna 101a and the first receiving circuit 102a and a pair of the second antenna 101b and the second receiving circuit 102b are provided has been explained, but it is also possible to provide three or more pairs and perform an addition in the adder 103.

Figure 2:
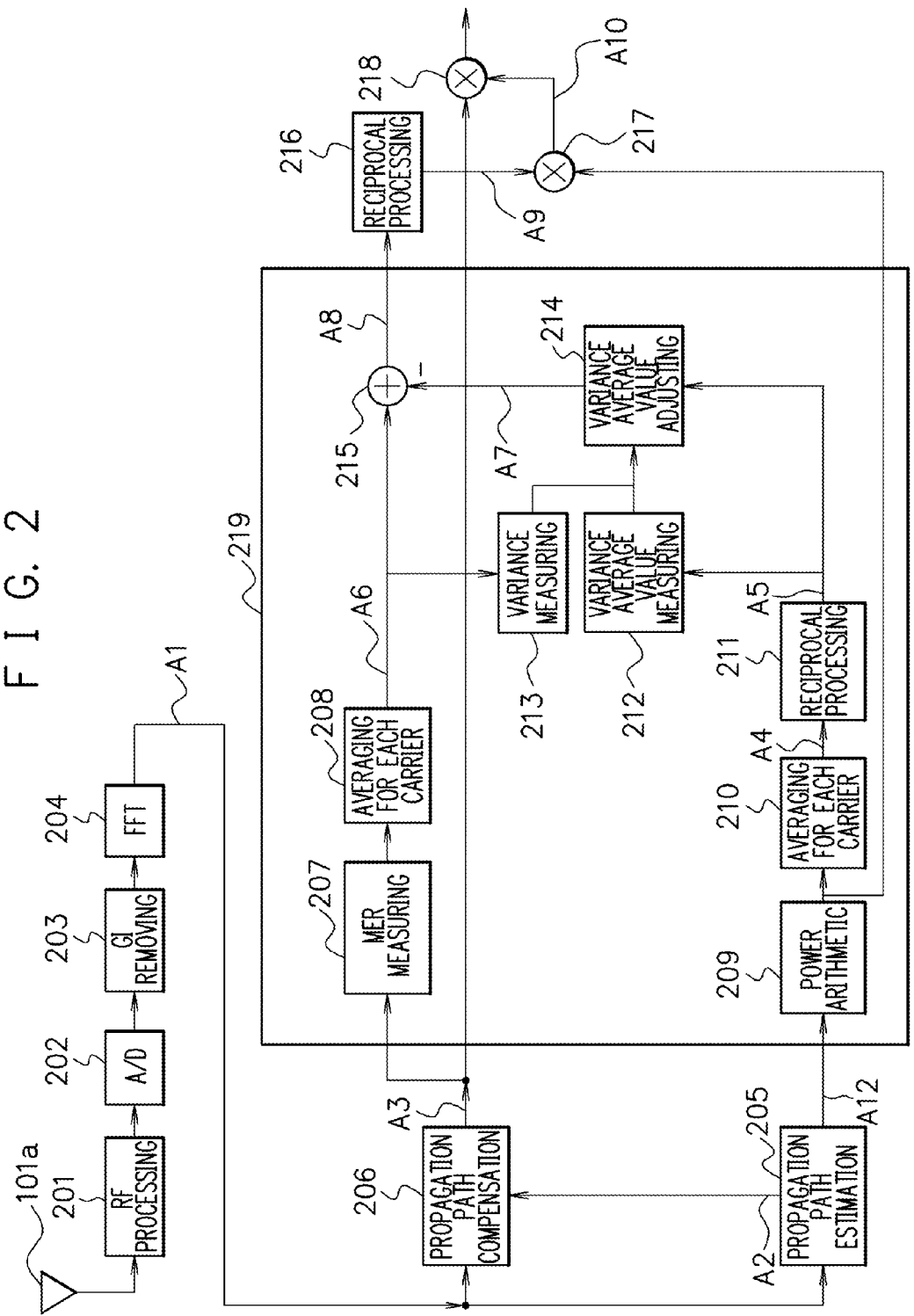
FIG. 2 is a diagram illustrating a configuration example of a first receiving circuit in FIG. 1.
Figure 4:
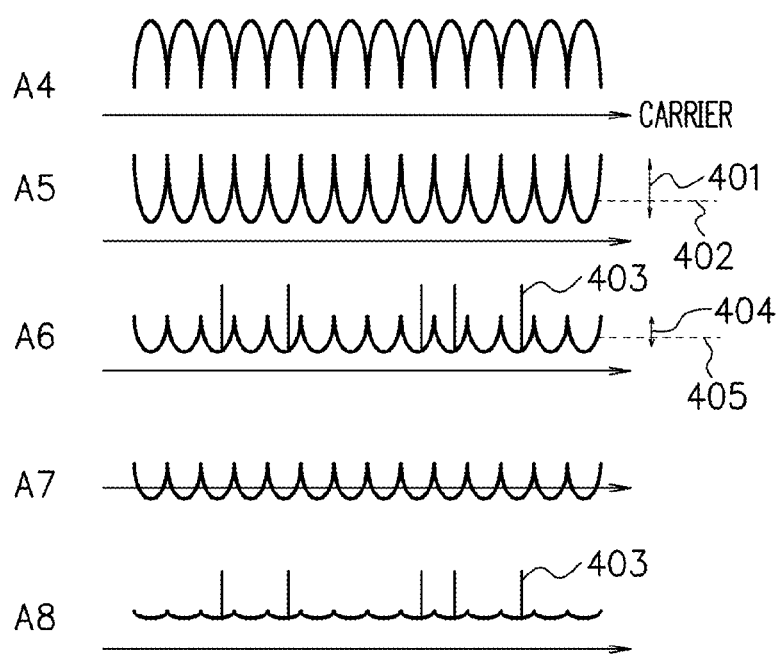
FIG. 4 is a view illustrating a processing method of the first receiving circuit in FIG. 2.

FIG. 2 is a diagram illustrating a configuration example of the first receiving circuit 102a in FIG. 1, and FIG. 4 is a view illustrating a processing method of the first receiving circuit 102a in FIG. 2. In FIG. 4, the horizontal axis indicates a carrier, and the vertical axis indicates the magnitude of signal. The first receiving circuit 102a includes: a RF (Radio Frequency) processing unit 201; an analog and digital (A and D) converting unit 202; a guard interval (GI) removing unit 203; a Fast Fourier Transformation (FFT) unit 204; a propagation path estimation unit 205; a propagation path compensation unit 206; a weighting coefficient generation unit 219; a second reciprocal processing unit 216; a first multiplier 217; and a second multiplier 218. The weighting coefficient generation unit 219 includes: a modulation error ratio (MER) measuring section 207; a second averaging section 208; a power arithmetic section 209; a first averaging section 210; a first reciprocal processing section 211; a variance average value measuring section 212; a variance measuring section 213; a variance average value adjusting section 214; and a subtractor 215. Hereinafter, the configuration of the first receiving circuit 102a will be explained as an example, but the second receiving circuit 102b also has a configuration similar to that of the first receiving circuit 102a.

Figure 3:
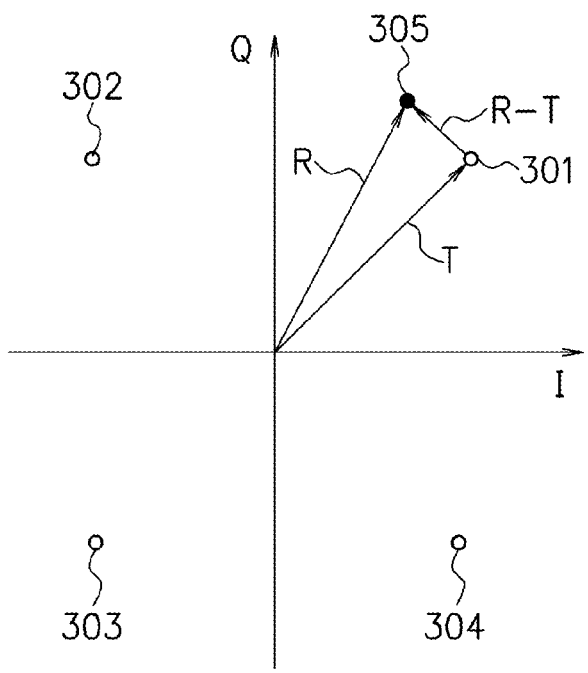
FIG. 3 is a view illustrating signal points.

The first antenna 101a receives radio signals in an orthogonal frequency division multiplexing (OFDM) system. As for the radio signals in the OFDM system, symbol signals are transmitted at a predetermined time interval. Each symbol has a plurality of carriers (frequencies). The RF processing unit 201 down-converts the frequency of the signal received via the first antenna 101a and converts the signal into a baseband signal from a RF signal to output a signal. The analog and digital converting unit 202 analog-to-digital converts the signal output from the RF processing unit 201 to output a signal. The GI removing unit 203 removes a guard interval of the signal output from the analog and digital converting unit 202 to output a signal. The guard interval is a redundant portion obtained by copying a rear portion of data of a symbol to add the copied portion to the front of the date for the purpose of preventing intersymbol interference in which data of a symbol interferes with data of the previous symbol and data of the subsequent symbol. The FFT unit 204 transforms the signal output from the GI removing unit 203 into a frequency domain from a time domain by Fourier transformation to output a signal A1. The signal A1 contains an I channel signal and a Q channel signal in each carrier as illustrated in FIG. 3.

The propagation path estimation unit 205 estimates a propagation path characteristic A2 based on a known pilot signal in the signal A1 in the frequency domain transformed by the FFT unit 204. The pilot signal is a known signal contained in a predetermined carrier of each symbol, and communication data is contained in the other carriers. The pilot signal contains known data and is dispersively disposed in a symbol (time) direction and in a carrier (frequency) direction. As illustrated in FIG. 3, a transmission signal T of the transmitting device propagates to the receiving device as a reception signal R through a propagation path. The reception signal R of the receiving device results in a signal obtained by multiplying the transmission signal T of the transmitting device by the propagation path characteristic A2. The propagation path estimation unit 205 estimates the propagation path characteristic A2 by dividing a pilot signal R of the reception signal by a pilot signal T of the known transmission signal. The propagation path compensation unit 206 compensates the signal A1 by dividing the signal A1 output from the FFT unit 204 by the propagation path characteristic A2 to restore a signal A3 corresponding to the transmission signal.

The power arithmetic section 209 squares an I channel component and a Q channel component of the known pilot signal in the signal A1 to sum the results, to thereby arithmetically operate power of the known pilot signal in the signal A1 to output the power. Incidentally, it is also possible that the power arithmetic section 209 squares I channel components and Q channel components of signals of all the carriers in the signal A1 to sum the results, to thereby arithmetically operate power of the signals of all the carriers in the signal A1. The first averaging section 210 averages the power output by the power arithmetic section 209 in the symbol (time) direction for each carrier to output a signal A4. By the averaging, an effect of noise such as additive white Gaussian noise (AWGN) is decreased and only a frequency selective fading component caused by multipath is left.

As illustrated in FIG. 4, the signal A4 contains notches caused by frequency selective fading. The signal A4 becomes substantially the same in all the carriers if there is no effect of propagation paths. However, due to the effect of multipath of propagation paths, frequency selective fading in which fading variation differs in each carrier occurs. Thereby, the signal A4 differs in magnitude in each carrier, and a notch in which the signal A4 becomes small in a predetermined carrier is generated.

The first reciprocal processing section 211 performs reciprocal processing on the signal output from the first averaging section 210 to output a signal A5. The variance average value measuring section 212 measures a variance 401 and an average value 402 of the signal A5.

The MER measuring section 207 is an error arithmetic section that measures a MER being an error of the signal A3. In the case of quadrature phase shift keying (GPSK), data of a symbol is expressed by four ideal signal points 301 to 304 as illustrated in FIG. 3. The four ideal signal points 301 to 304 are expressed by the I channel signal and the Q channel signal. A reception signal point 305 in a first quadrant is estimated to contain an error with respect to the ideal signal point 301 in the first quadrant. A reception signal point in a second quadrant is estimated to contain an error with respect to the ideal signal point 302 in the second quadrant. A reception signal point in a third quadrant is estimated to contain an error with respect to the ideal signal point 303 in the third quadrant. A reception signal point in a fourth quadrant is estimated to contain an error with respect to the ideal signal point 304 in the fourth quadrant. For example, the ideal signal point 301 is a signal point of the transmission signal T. The reception signal point 305 is a signal point of the reception signal R. The MER measuring section 207 subtracts the ideal signal point 301 of the transmission signal T from the reception signal point 305 of the reception signal R to arithmetically operate a signal R-T as a MER (an error).

The second averaging section 208 averages a signal output from the MER measuring section 207 in the symbol (time) direction for each carrier to output a signal A6. In the signal A6, MERs 403 caused by spurious waves in a narrow-band are mixed in addition to notches caused by frequency selective fading similar to those of the signal A5. Incidentally, the signal A4 is on the same dimension as that of the CNR, and the signal A5 is on the same dimension as that of the MER of the signal A6. The variance measuring section 213 measures a variance 404 of the signal A6. An average value 405 is an average value of the signal A6.

The variance average value adjusting section 214 receives the variance 401 and the average value 402 of the signal A5 and the variance 404 of the signal A6 and adjusts the variance and the average value of the signal A5 to output a signal A7. A variance of the signal A7 is adjusted to be the same as the variance 404 of the signal A6. An average value of the signal A7 is adjusted to be "0."

Incidentally, the variance average value adjusting section 214 may be the one to adjust the variance 401 of the signal A5 and the variance 404 of the signal A6 to be the same each other. That is, the variance average value adjusting section 214 adjusts the variance of the signal A5 and the variance of the signal A6 so as to obtain a small difference in variance between the signal A5 and the signal A6.

When the reception signal is automatically gain controlled (AGC), the magnitude of the signal A5 varies according to a gain value. Further, an arithmetic method of the power arithmetic section 209 and a measurement method of the MER measuring section 207 are different, so that the variance 401 of the signal A5 and the variance 404 of the signal A6 do not often agree with each other. Further, there is also a method in which a gain value of AGC is used to estimate the magnitude of the signal A5, but an AGC amplifier often has nonlinear characteristics, and it is difficult to estimate a correct gain value of AGC. Thus, in this embodiment, the variances and the average values are adjusted by the variance average value adjusting section 214.

The subtractor 215 subtracts the signal A7 from the signal A6 for each carrier to output a signal A8. The signal A6 contains an error caused by frequency selective fading and errors 403 caused by spurious waves. The signal A7 contains an error caused by frequency selective fading. Due to the subtraction, the signal A8 contains only the errors 403 caused by spurious waves. The second reciprocal processing unit 216 performs reciprocal processing on the signal A8 output from the subtractor 215 to output a signal A9. The signal A9 is on the same dimension as that of the CNR and contains a CNR component by spurious waves.

The first multiplier 217 multiplies the signal output from the power arithmetic section 209 and the signal A9 together for each carrier to output a signal A10. The signal A4 is a weighting coefficient containing a CNR component by frequency selective fading. The signal A9 is a weighting coefficient containing a CNR component by spurious waves. The signal A10 is a weighting coefficient containing a CNR component by frequency selective fading and a CNR component by spurious waves.

The second multiplier 218 multiplies the signal A3 compensated by the propagation path compensation unit 206 by the signal A10 to output a signal obtained by the multiplication to the adder 103 in FIG. 1. For example, in FIG. 1, when the CNR in the first receiving circuit 102a is large and the CNR in the second receiving circuit 102b is small, the signal A10 being the weighting coefficient of the first receiving circuit 102a increases and the signal A10 being the weighting coefficient of the second receiving circuit 102b decreases. Conversely, when the CNR in the first receiving circuit 102a is small and the CNR in the second receiving circuit 102b is large, the signal A10 being the weighting coefficient of the first receiving circuit 102a decreases and the signal A10 being the weighting coefficient of the second receiving circuit 102b increases. The plural antennas 101a and 101b are provided, the weighting coefficient of the receiving circuit 102a or 102b having a larger CNR is increased, and multiplication is performed, thereby making it possible to decrease effects of frequency selective fading and spurious waves. This makes it possible to improve reception quality.

Next, there will be explained an advantage obtained by providing the subtractor 215. FIG. 5A and FIG. 5B are views illustrating examples of the signals A4, A9, and A10 when the subtractor 215 is removed from FIG. 2. In this case, the second reciprocal processing unit 216 performs reciprocal processing on the signal A6 output from the second averaging section 208. FIG. 5A illustrates the examples of the signals A4, A9, and A10 of the first receiving circuit 102a. FIG. 5B illustrates the examples of the signals A4, A9, and A10 of the second receiving circuit 102b. The signal A4 is the output signal of the first averaging section 210, and contains received power 501 by frequency selective fading and received power 502 by spurious waves. The signal A9 is the output signal of the second reciprocal processing unit 216, and contains a CNR component 503 by frequency selective fading and a CNR component 504 by spurious waves. The signal A10 is the output signal of the first multiplier 217, and is a signal obtained by multiplying the signal output from the power arithmetic section 209 and the signal A9 together. The first multiplier 217 multiplies the received power 501 by frequency selective fading and the CNR component 503 by frequency selective fading together in a carrier not having the received power 502 by spurious waves and in a carrier not having the CNR component 504 by spurious waves. As a result, a frequency selective fading component is squared, as is a signal 505 in the signal A10, the frequency selective fading component is emphasized too much, and appropriate weighting cannot be applied, resulting in that reception quality deteriorates.

That is, the signal A10 preferably contains only one of the received power 501 by frequency selective fading in the signal A4 and the CNR component 503 by frequency selective fading in the signal A9 in a carrier having no spurious waves. When the received power 501 by frequency selective fading and the CNR component 503 by frequency selective fading are multiplied together, as is the signal 505 in the signal A10, the frequency selective fading component is emphasized too much and reception quality deteriorates.

In contrast to this, in this embodiment, as illustrated in FIG. 2, the subtractor 215 is provided and thereby the signal A7 is subtracted from the signal A6. As illustrated in FIG. 4, the signal A6 contains the error caused by frequency selective fading and the errors 403 caused by spurious waves. By subtracting the signal A7 from the signal A6, in the signal A8, the error caused by frequency selective fading is removed and only the errors 403 caused by spurious waves remain. The first multiplier 217 multiplies the signal output from the power arithmetic section 209 and the signal A9 together, so that in the signal A10 being the weighting coefficient, the frequency selective fading component in the signal A6 is removed and the frequency selective fading component in the signal A7 is contained. Thereby, it is possible to prevent that the frequency selective fading is emphasized too much by the square of the frequency selective fading component as is the signal 505 in the signal A10 in FIG. 5A and FIG. 5B, and to generate the signal A10 being an appropriate weighting coefficient. This makes it possible to improve reception quality.

Second Embodiment

Figure 6:
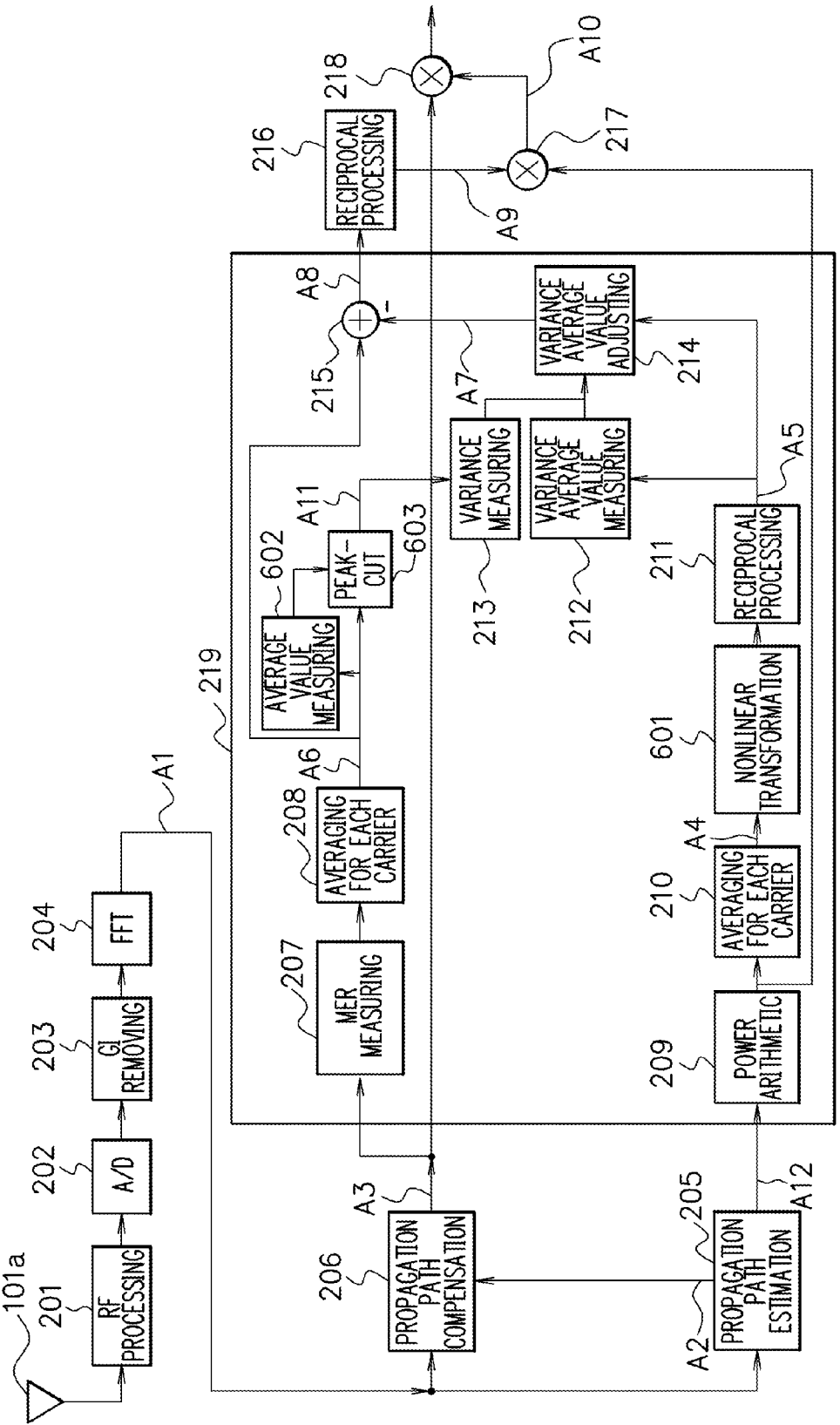
FIG. 6 is a diagram illustrating a configuration example of a first receiving circuit according to a second embodiment.

FIG. 6 is a diagram illustrating a configuration example of a first receiving circuit 102a according to a second embodiment. A second receiving circuit 102b also has a configuration similar to that of the first receiving circuit 102a. This embodiment (FIG. 6) is one in which a nonlinear transformation section 601, an average value measuring section 602, and a peak-cut section 603 are added to the first embodiment (FIG. 2). Hereinafter, there will be explained points of which this embodiment is different from the first embodiment.

The nonlinear transformation section 601 nonlinearly transforms a signal A4 output from a first averaging section 210 to output a signal to a first reciprocal processing section 211. The first reciprocal processing section 211 performs reciprocal processing on the signal output from the nonlinear transformation section 601 to output a signal A5.

FIG. 7A and FIG. 7B are views for explaining a transformation method of the nonlinear transformation section 601 in FIG. 6. As illustrated in FIG. 7A, the signal A4 has a linear characteristic with respect to an actual CNR. In contrast to this, as illustrated in FIG. 7B, a signal A9 has a nonlinear characteristic with respect to an actual CNR. As for the signal A9, the characteristic becomes nonlinear due to an effect of bit precision of a digital signal in a region with a small CNR. Further, as for the signal A9, in a region with a large CNR, the characteristic becomes nonlinear in order to, as illustrated in FIG. 3, deny the possibility that the reception signal point 305 in the first quadrant is that an error is caused in the ideal signal point 302 in the second quadrant and to arithmetically operate an error R-T between the ideal signal point 301 and the reception signal point 305 in the first quadrant. When a subtractor 215 performs a subtraction based on the signal A4 having a linear characteristic in FIG. 7A and the signal A9 having a nonlinear characteristic in FIG. 7B, the precision of a signal A8 decreases. Thus, the nonlinear transformation section 601 nonlinearly transforms the signal A4 so as to match the nonlinear characteristic of the signal A9 in FIG. 7B. Concretely, in consideration of the first reciprocal processing section 211 performing reciprocal processing, the nonlinear transformation section 601 nonlinearly transforms the signal A4 so as to provide an inverse characteristic to the nonlinear characteristic in FIG. 7B. For example, the nonlinear transformation section 601 performs nonlinear transformation such that the characteristic becomes inverse to nonlinear transformation with the horizontal axis in FIG. 7B set as an input signal and the vertical axis in FIG. 7B set as an output signal. The nonlinear transformation section 601 performs nonlinear transformation with a logarithmic transformation function, a transformation function based on a square root, or a transformation table. In the case of the transformation table, it is only necessary that the nonlinear characteristic of FIG.

7B should be measured beforehand and a transformation table that provides an inverse characteristic of the nonlinear characteristic should be used.

Incidentally, the nonlinear transformation section 601 may also be provided at the subsequent stage of the first reciprocal processing section 211. In the case, the first reciprocal processing section 211 performs reciprocal processing on the signal A4 to output a signal. The nonlinear transformation section 601, similarly to the nonlinear characteristic in FIG. 7B, nonlinearly transforms the signal output from the first reciprocal processing section 211 to output a nonlinearly transformed signal to a variance average value measuring section 212 and a variance average value adjusting section 214.

FIG. 8 is a view for explaining processing methods of the average value measuring section 602 and the peak-cut section 603 in FIG. 6. In the first embodiment (FIG. 2), the variance measuring section 213 measures a variance 802 of the signal A6. However, when the number of carriers containing a spurious wave component is increased in the signal A6, the variance 802 of the signal A6 increases. The variance measuring section 213 preferably removes the spurious wave component from the signal A6 to obtain a variance 801 of only a propagation path component.

The average value measuring section 602 measures an average value 805 of the signal A6 output from a second averaging section 208. The peak-cut section 603 sets a threshold value 804 obtained by constant multiplying the average value 805 of the signal A6 and sets an error 803 that is equal to or more than the threshold value 804 in the average value 805 to output a signal A11. That is, the peak-cut section 603 removes the error 803 equal to or more than the threshold value 804 from the signal A6 and sets an average value of the signal A11 in the average value 805 to output the signal A11. The variance measuring section 213 measures a variance of the signal A11 output from the peak-cut section 603. Thereby, the variance measuring section 213 can remove a spurious wave component and obtain a variance of a propagation path component.

Third Embodiment

FIG. 9 is a diagram illustrating a configuration example of a first receiving circuit 102a according to a third embodiment. A second receiving circuit 102b also has a configuration similar to that of the first receiving circuit 102a. Hereinafter, there will be explained points of which this embodiment (FIG. 9) is different from the first embodiment (FIG. 2). A first multiplier 217 receives a signal A4 output from a first averaging section 210 in place of a signal output from a power arithmetic section 209. That is, the first multiplier 217 multiplies the signal A4 output from the first averaging section 210 and a signal A9 together for each carrier to output a signal A10.

On the condition that a receiving device stands still or a moving speed of the receiving device is slow, when the first multiplier 217 receives the signal A4 output from the first averaging section 210 rather than the signal output from the power arithmetic section 209, it is sometimes possible to decrease an effect of AWGN and to improve reception quality.

Incidentally, a spurious wave is normally generated at the same frequency and with the same magnitude constantly, and in contrast to this, the signal output from the power arithmetic section 209 changes from moment to moment by the receiving device moving mainly. Thus, when the first multiplier 217 receives the signal A4 output from the first averaging section 210, changes of the signal A4 become gentle to be difficult to be reflected in the signal A10 being a weighting coefficient. Therefore, when the receiving device moves, as is the first embodiment (FIG. 2), the first multiplier 217 sometimes preferably receives the signal output from the power arithmetic section 209.

Fourth Embodiment

FIG. 10 is a diagram illustrating a configuration example of a first receiving circuit 102a according to a fourth embodiment. A second receiving circuit 102b also has a configuration similar to that of the first receiving circuit 102a. Hereinafter, there will be explained points of which this embodiment (FIG. 10) is different from the second embodiment (FIG. 6). Similarly to the third embodiment, a first multiplier 217 receives a signal A4 output from a first averaging section 210 in place of a signal output from a power arithmetic section 209. That is, the first multiplier 217 multiplies the signal A4 output from the first averaging section 210 and a signal A9 together for each carrier to output a signal A10. Thereby, this embodiment can obtain an effect similar to that of the third embodiment.

As described above, according to the first to fourth embodiments, even when a spurious wave is mixed in a reception signal in addition to frequency selective fading caused by multipath, weighting is applied by an optimized weighting coefficient for each carrier and signals output from the plural receiving circuits 102a and 102b are combined in the adder 103. Thereby, it is possible to decrease the effect of frequency selective fading caused by multipath and the effect by spurious waves and to improve reception quality.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The error arithmetic section outputs an error caused by an effect of frequency selective fading caused by multipath and an effect of spurious waves. The first reciprocal processing section outputs an error caused by an effect of frequency selective fading caused by multipath. The subtractor outputs an error caused by an effect of spurious waves. The effect of spurious waves can be decreased by the first multiplier and the effect of frequency selective fading caused by multipath can be decreased by the second multiplier, resulting in that it is possible to improve reception quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A receiving device, comprising:
   a plurality of antennas;
   each of a plurality of receiving circuits that receive signal via one of the plurality of antennas, respectively; and
   an adder that adds signals output from the plurality of receiving circuits, wherein each of the plurality of receiving circuits comprises:
a Fourier transformation unit that transforms a signal into a frequency domain from a time domain;
a propagation path estimation unit that estimates a propagation path characteristic based on a known signal in the signal in the frequency domain transformed by the Fourier transformation unit;
a propagation path compensation unit that compensates the signal in the frequency domain transformed by the Fourier transformation unit by using the propagation path characteristic estimated by the propagation path estimation unit;
a power arithmetic section that arithmetically operates power of the signal in the frequency domain transformed by the Fourier transformation unit;
a first reciprocal processing section that performs reciprocal processing on the power arithmetically operated by the power arithmetic section to output a signal;
an error arithmetic section that arithmetically operates an error of the signal compensated by the propagation path compensation unit;
a subtractor that subtracts the signal output from the first reciprocal processing section from the error arithmetically operated by the error arithmetic section to output a signal;
a second reciprocal processing unit that performs reciprocal processing on the signal output from the subtractor to output a signal;
a first multiplier that multiplies the power arithmetically operated by the power arithmetic section and the signal output from the second reciprocal processing unit together to output a signal; and
a second multiplier that multiplies the signal compensated by the propagation path compensation unit and the signal output from the first multiplier together to output a signal to the adder.

2. The receiving device according to claim 1, further comprising:

a first averaging section that averages the power arithmetically operated by the power arithmetic section for each frequency to output a signal; and
a second averaging section that averages the error arithmetically operated by the error arithmetic section for each frequency to output a signal, wherein
the first reciprocal processing section performs reciprocal processing on the signal output from the first averaging section,
the subtractor subtracts a signal output from the first reciprocal processing section from the signal output from the second averaging section, and
the first multiplier multiplies the signal output from the first averaging section and the signal output from the second reciprocal processing unit together.

3. The receiving device according to claim 1, wherein
the subtractor adjusts a difference between the error arithmetically operated by the error arithmetic section and a variance of the signal output from the first reciprocal processing section and then performs a subtraction.

4. The receiving device according to claim 1, wherein
the subtractor adjusts an average value of the signal output from the first reciprocal processing section and then performs a subtraction.

5. The receiving device according to claim 1, further comprising:
a nonlinear transformation section that nonlinearly transforms the power arithmetically operated by the power arithmetic section or the signal output from the first reciprocal processing section to output a signal.

6. The receiving device according to claim 3, further comprising:
a peak-cut section that removes an error equal to or more than a threshold value from errors arithmetically operated by the error arithmetic section to output a signal, wherein
the subtractor adjusts a difference in variance between the signal output from the peak-cut section and the signal output from the first reciprocal processing section.

* * * * *